Sept. 2, 1952  K. G. GUHLIN ET AL  2,609,161

LEVEL WIND REEL

Filed Dec. 1, 1950

INVENTORS
KJALL G. GUHLIN,
NILS G. GUHLIN,
BY
McMorrow, Berman + Davidson
ATTORNEYS.

Patented Sept. 2, 1952

2,609,161

UNITED STATES PATENT OFFICE 2,609,161

LEVEL WIND REEL

Kjall G. Guhlin and Nils G. Guhlin, Houston, Tex.

Application December 1, 1950, Serial No. 198,562

3 Claims. (Cl. 242—84.4)

This invention relates to an improved reel incorporating means for level winding of line thereon, and more particularly to improved cam and lever line distributing means for a fishing reel, the primary object of the invention being to provide a simplified, longer lasting and more efficient arrangement of this kind.

Another important object of the invention is to provide an arrangement of the character indicated above in which threading a line through the eye of the line distributing lever is eliminated in favor of a simple sidewise insertion of the line therein.

A further important object of the invention is to provide an arrangement of the character indicated above in which the line distributing lever is made of spring wire, and can be easily disengaged from, removed and replaced, when desired, with respect to the cam on the camshaft and the guide for the lever.

Other important objects and advantageous features of the invention will be apparent from the following description and the accompanying drawings, wherein, for purposes of illustration only, a specific embodiment of the invention is set forth in detail.

In the drawings, wherein like numerals designate like parts throughout the several views.

Figure 1:
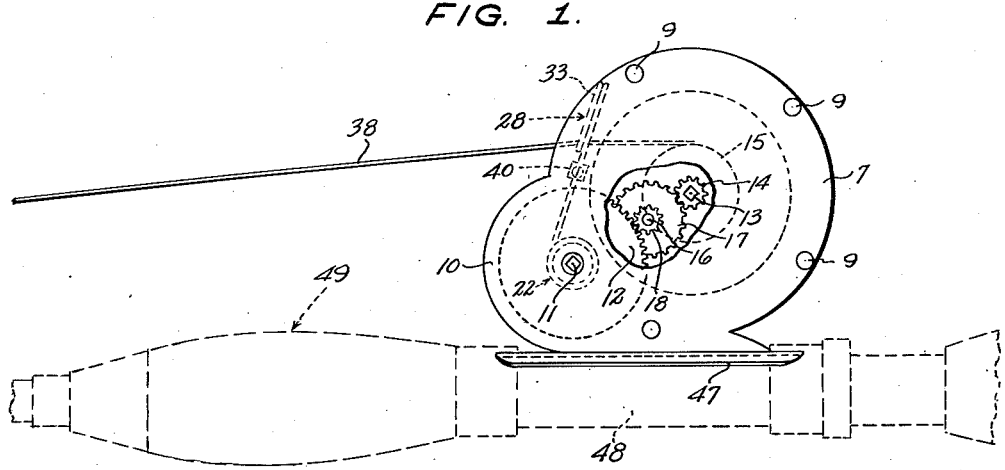
Figure 1 is a general left hand side elevation, partly broken away, showing the improved reel mounted on the reel seat of a fishing rod, shown in dotted lines.

Referring in detail to the drawings, the illustrated reel comprises a frame having a pair of spaced hollow head plates 7 and 8, respectively, spaced and connected conventionally by pillars 9 at circumferentially spaced intervals. The head plates have generally semi-circular forward extensions 10, between and in which is centrally journaled the camshaft 11. The camshaft has a relatively larger gear wheel 12 within the interior of the left hand hollow head plate 7. The spool shaft 13 extends between and is journaled axially in the head plates 7 and 8 and has within the head plate 7 a small pinion 14, a spool 15 being fixedly circumposed on the spool shaft 13 between the head plates. A drive shaft 16 extends between and is journaled in the head plates at a point between and in the same plane as the camshaft 11 and the spool shaft 13. A gear wheel 17 smaller than the camshaft gear wheel 12 is fixed on the drive shaft 16 and is in mesh with the spool shaft pinion 14 within the left hand head plate 7. A pinion 18 also fixed on the drive shaft 16 is in mesh with the camshaft gear wheel 12. The arrangement of the gear wheels and pinions is such that on manual rotation of the drive shaft 16 by means of the usual crank 19 fixed on the right hand end thereof, the camshaft 11 is turned at a relatively slow rate, compared to both the drive shaft 16 and the spool shaft 13.

Figure 5:
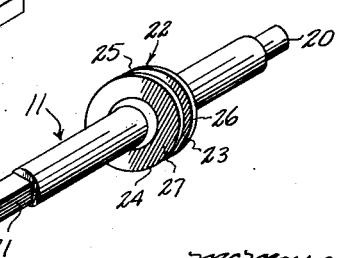
Figure 5 is an enlarged perspective view of the camshaft.

The camshaft 11, as shown in Figure 5, is a plain shaft having a reduced round end 20 which turns freely in the head plate 8 and a reduced squared end 21 on which the gear wheel 12 is non-rotatably circumposed. Midway between its ends the camshaft 11 is provided with a fixed cam 22 in the form of an enlargement 23 which is concentric with the shaft and disposed at an oblique angle to the axis of the camshaft such that the line distributing lever, hereinafter described, is operated to the extreme opposite ends of the spool 15 on the spool shaft 13. The annular enlargement 23 is formed in its peripheral edge 24 with a bearing groove 25, whose sides 26 are parallel and parallel to the opposite sides 27 of the enlargement. The bearing groove 25 is concentric with the camshaft 11.

Figure 2:
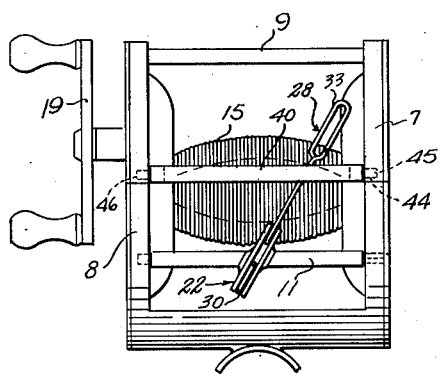
Figure 2 is a front elevation of the reel.
Figure 3:
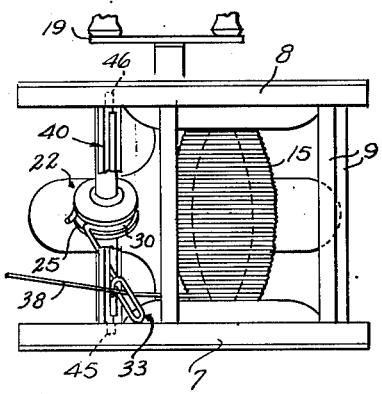
Figure 3 is a top plan view thereof.
Figure 6:
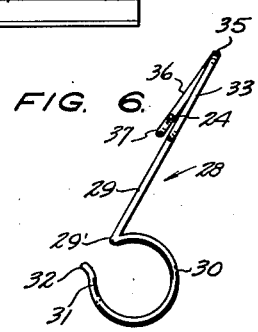
Figure 6 is a side elevation of the line distributing lever.

The line distributing lever, generally designated 28, consists preferably of a single length of spring wire, such as .055 piano wire, having a straight intermediate or arm portion 29. On the lower end 29' of the arm portion 29 is an open bearing ring 30 extending rearwardly from and in the vertical plane of the arm portion 29, as shown in Figures 2 and 6. The bearing ring 30 is discontinuous at the point 31, which is in downwardly spaced relation to the lower end 29' of the arm portion 29, and terminates in a forwardly and upwardly curved terminal 32. On the upper end of the arm portion 29 is a line guiding eye 33 formed of a portion 34 laterally offset to the left hand side of and parallel to the arm portion 29, an upwardly bowed transversely extending connecting portion 35 on the upper end of the portion 34, and another portion 36 similar to and parallelly spaced from the portion 34. The portion 36 is offset from the opposite side of the arm portion 29 from the portion 34 and has on its lower end a transversely extending terminal 37 which extends across the arm portion 29 and in front thereof and is directed upwardly to spacedly overlie the lower part of the eye portion 34. The spacing of the terminal 37 from the lower part of the eye portion 34 provides for easy sidewise removal of the line from the eye 33, thereby eliminating the trouble involved in threading the line through a line guide eye.

Figure 4:
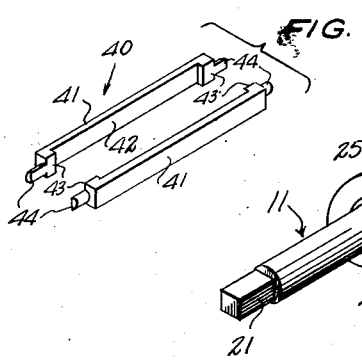
Figure 4 is an exploded perspective view of the lever guide.

The straight arm portion 29 of the lever 28 works slidably in a sidewise motion in the rockable lever guide 40. The lever guide 40, as shown in Figures 2 and 4, consists of two similar guide bars 41, having plane inset guide surfaces 42 on their facing sides, which define a guide slot with stop shoulders 43 at its opposite ends. The bars 41 have half-round complementary lugs 44 on their opposite ends, which, when the guide bars 41 are mated, form cylindrical pivot pins which turn in journal holes 45 and 46 in the inward sides of the head plates 7 and 8, respectively, as the line distributing lever 28 works back and forth across the spool 15. As indicated in Figure 1, the lever guide 40 is spaced above the camshaft 11 and slightly to the rear thereof. The shoulders 43 engage in the assembled position of the guide bars 41, whereby the guide surfaces 42 are parallelly spaced at such a distance that the line distributing lever arm portion 29 works slidably but freely on and between the guide surfaces, with the line guiding eye 33 positioned at the forward side of and above the spool 15, as shown in Figures 1 and 2, with the lower end of the eye 33 approximately on a level with the spool 15 whereby the line 38 is guided levelly directly onto the spool.

It will be obvious that as the hand crank 19 is turned, the spool 15 is turned in a line winding direction at a relatively fast rate, and the camshaft is turned at a much slower rate than the drive shaft 16. With the ring 30 of the lever 28 snapped in place in the groove 25 of the cam 22 and the arm portion 29 between the bars 41 of the guide 40, and the line 38 in the eye 33, the rotation of the cam 22 will swing the lever 28 slowly from side to side to guide the line 38 levelly and evenly from end to end of the spool 15.

Should it be desired to remove the lever 28, it is necessary only to pull the bearing ring 30 out of the cam bearing groove 25, turn the lever sidewise, and lift the lever so as to pass the ring 30 upwardly between the guide bars 41, whereupon the lever 28 is free from the reel. Replacement of the lever 28 involves simply reversing these operations.

The above described reel has conventional means 47 for mounting the reel on the reel seat 48 of a fishing rod 49.

What is claimed is:

1. In a reel, a frame comprising a pair of spacedly connected head plates, a rotary spool shaft, a rotary camshaft, and a drive shaft journaled in and extending between said head plates, rotary driving means operatively connecting said shafts for rotation together, a cam on said camshaft formed with a bearing groove concentric with the axis of said camshaft, said bearing groove having plane parallel sides arranged in planes similarly oblique to the axis of said camshaft, a line distributing lever having a straight arm comprising a line guiding eye at one end and a bearing ring on its opposite end, said bearing ring being discontinuous and resilient and encircling said cam and being rotatably confined in said bearing groove, and a rockable lever guide extending between and journaled at its ends in said head plates alongside of spool shaft, said lever guide having a longitudinal guide slot through which said lever arm slidably extends whereby said lever is oscillated along said spool shaft as said drive means is rotated.

2. In a reel, a frame comprising a pair of spacedly connected head plates, a rotary spool shaft, a rotary camshaft, and a drive shaft journaled in and extending between said head plates, rotary driving means operatively connecting said shafts for rotation together, a cam on said camshaft formed with a bearing groove concentric with the axis of said camshaft, said bearing groove having plane parallel sides arranged in planes similarly oblique to the axis of said camshaft, a line distributing lever comprising a straight arm having a line guiding eye at one end and a resilient bearing ring on its opposite end, said bearing ring being discontinued and being snapped into and encircling said cam and being rotatably confined in said bearing groove, and a rockable lever guide extending between and journaled at its ends in said headplates alongside of said spool shaft, said lever guide having a longitudinal guide slot through which said lever arm slidably extends whereby said lever is oscillated along said spool shaft as said drive means is rotated, said bearing ring being an open spring ring having ends arranged to be spread apart for removal of said ring from and installation of said ring in said bearing groove.

3. In a reel, a frame comprising a pair of spacedly connected head plates, a rotary spool shaft, a rotary camshaft, and a drive shaft journaled in and extending between said head plates, rotary driving means operatively connecting said shafts for rotation together, a cam on said camshaft formed with a bearing groove concentric with the axis of said camshaft, said bearing groove having plane parallel sides arranged in planes similarly oblique to the axis of said camshaft, a line distributing lever having a straight arm having a line guiding eye at one end and a bearing ring on its opposite end, said bearing ring encircling said cam and being rotatably confined in said bearing groove, and a rockable lever guide extending between and journaled in said head plates alongside of said spool shaft, said lever guide having a longitudinal guide slot through which said lever arm slidably extends whereby said lever is oscillated along said spool shaft as said drive means is rotated, said lever guide comprising a pair of laterally spaced guide bars having their ends journaled in holes formed in said head plates.

KJALL G. GUHLIN.
NILS G. GUHLIN.

REFERENCES CITED

The following references are of record in the file of this patent:

UNITED STATES PATENTS

| Number | Name | Date |
|---|---|---|
| 1,199,740 | Comparet | Sept. 26, 1916 |
| 1,438,007 | Welch | Dec. 5, 1922 |

FOREIGN PATENTS

| Number | Country | Date |
|---|---|---|
| 561,849 | France | Aug. 20, 1923 |